Figure 1:
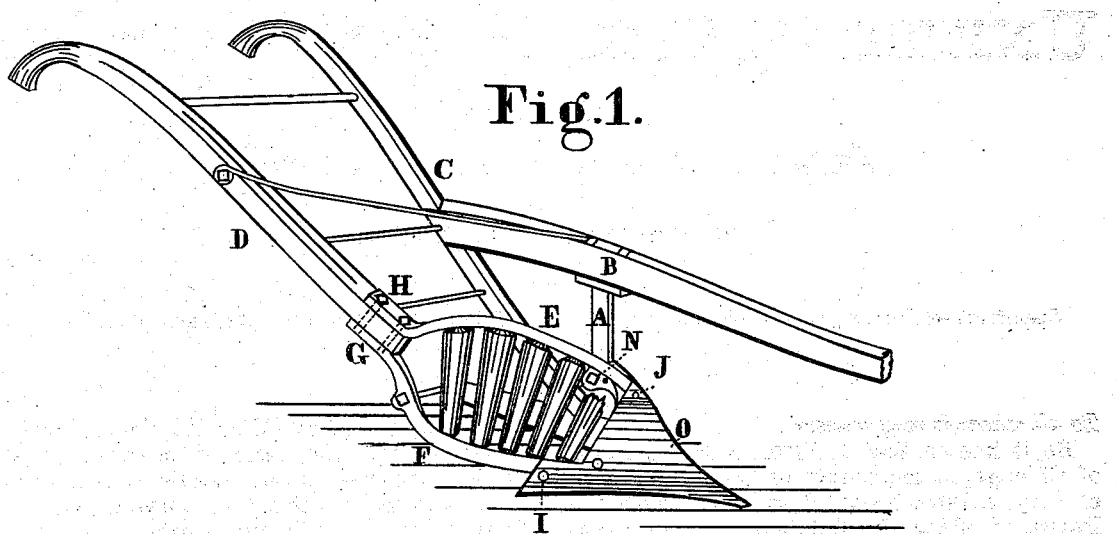

P. H. DECKER.
Plows.

No. 156,283.  Patented Oct. 27, 1874.

Attest:  Inventor:

J. W. Elliott.  Phillip H. Decker.
J. N. Barker  Per G. L. Chapin.

Atty.

UNITED STATES PATENT OFFICE.

PHILLIP H. DECKER, OF CHICAGO, ILLINOIS.

IMPROVEMENT IN PLOWS.

Specification forming part of Letters Patent No. 156,283, dated October 27, 1874; application filed March 21, 1874.

*To all whom it may concern:*

Be it known that I, PHILLIP H. DECKER, of Chicago, in the county of Cook and State of Illinois, have invented an Improvement in Plows, of which the following is a specification:

The object of this invention is to improve the mold-board for plows patented by Isaac T. Dyer April 11, 1871, and numbered 113,642. The improvement consists in the elongated roller-bars, which are formed at their ends so as to clamp one handle of the plow and hold it in place.

In the drawing, Figure 1 is a perspective representation of a plow, showing my improvement.

B represents the beam; A, the plow-standard; C, the beam-handle; O, the share and forward part of the mold-board; and D, the furrow-handle, all of which are constructed similarly to the said Dyer's mold-board, and to an ordinary plow, except such parts as are hereinafter described and shown as novel. E represents the upper bar and F the lower bar, which support the anti-friction rollers pivoted therein, substantially in the same manner as the rollers are supported in the Dyer patent; but, in this case, the bar E is attachable from the standard A by means of a bolt, N, and is attached to the handle D at H. The bar F is detachable from the shear by means of bolts I, and is attached to the handle D at G, the two bars forming a clamp for supporting the handle D, which is bolted therein, as shown. The insides of the bars are provided with pivots for the rollers to turn on in the same manner as in the patent mentioned, as are also the rollers.

By means of this improvement, the expense of manufacturing is reduced, and any one of the several parts can be replaced by a new one without damaging the other parts.

I disclaim the rollers, and also any adjustment of the bars to which they are pivoted, such as is shown in the patent to William A. Estes, No. 143,279, dated September 30, 1873, but confine myself specifically to the use of the bars as a clamp for the handle.

I claim, and desire to secure by Letters Patent of the United States—

The detachable bars E F, arranged and combined with the plow-handle, share, and rollers, as and for the purpose set forth.

PHILLIP H. DECKER.

Witnesses:
J. H. ELLIOTT,
G. L. CHAPIN.